US007159289B1

(12) United States Patent
Moore

(10) Patent No.: US 7,159,289 B1
(45) Date of Patent: Jan. 9, 2007

(54) FASTENER FORMING APPARATUS AND METHOD FOR MAKING A FASTENER OF METAL

(75) Inventor: Richard B. Moore, Washington, MI (US)

(73) Assignee: Ankara Industries, Inc., Chesterfield, MI (US)

( * ) Notice: Subject to any disclaimer, the term of this patent is extended or adjusted under 35 U.S.C. 154(b) by 232 days.

(21) Appl. No.: 10/850,028

(22) Filed: May 20, 2004

(51) Int. Cl.
*B23P 19/00* (2006.01)

(52) U.S. Cl. ........................ 29/243.5; 29/796; 29/509; 29/512

(58) Field of Classification Search .................. 29/505, 29/509, 521, 522.1, 523, 524.1, 283.5, 282, 29/243.5, 739, 844, 845, 512, 243.517, 795, 29/796; 292/340
See application file for complete search history.

(56) References Cited

U.S. PATENT DOCUMENTS

| | | | | |
|---|---|---|---|---|
| 3,119,435 | A * | 1/1964 | Greenman | 29/243.517 |
| 3,281,923 | A * | 11/1966 | Best et al. | 29/844 |
| 3,489,879 | A * | 1/1970 | Salzer | 219/152 |
| 4,550,493 | A * | 11/1985 | Darrow et al. | 29/739 |
| 4,650,231 | A * | 3/1987 | Shimura et al. | 292/340 |
| 4,707,007 | A | 11/1987 | Inoh | |
| D309,417 | S * | 7/1990 | Yamada | D8/345 |
| 4,981,313 | A * | 1/1991 | Makamura | 292/340 |
| 5,529,356 | A | 6/1996 | Cetnar | |
| 5,779,270 | A | 7/1998 | Tanaka | |
| 5,787,794 | A | 8/1998 | Plantan et al. | |
| 5,878,483 | A * | 3/1999 | Kman et al. | 29/739 |
| 6,095,576 | A | 8/2000 | Burton | |
| 6,106,037 | A | 8/2000 | Burton | |
| 6,108,894 | A * | 8/2000 | Mizuki et al. | 29/509 |
| 6,267,421 | B1 | 7/2001 | Burton | |
| 6,273,480 | B1 | 8/2001 | Burton | |
| 6,520,548 | B1 | 2/2003 | Fisher et al. | |
| 6,601,885 | B1 | 8/2003 | Yiu | |
| 6,616,204 | B1 | 9/2003 | Mitts et al. | |
| 6,698,080 | B1 * | 3/2004 | Sawajiri et al. | 29/509 |
| 6,823,575 | B1 * | 11/2004 | Petersen | 29/509 |

* cited by examiner

*Primary Examiner*—David P. Bryant
*Assistant Examiner*—Christopher M. Koehler
(74) *Attorney, Agent, or Firm*—Reising, Ethington, Barnes, Kisselle, P.C.

(57) ABSTRACT

A fastener forming apparatus produces a fastener of metal having a rod-to-plate connection often found in such applications as an automotive door latch striker. The fastener is formed and assembled in a single operation and with only a rod and a stamped plate for parts. The forming apparatus has a die structure for securing the rod, a base for vertically aligning the rod, a compression pedestal for vertically aligning the plate and a suspended stamping structure. The stamping structure moves from a pre-staged position for loading of the rod and plate to the die structure, to an intermediate position wherein a head is substantially formed unitarily at the end portion of the rod on one side of the plate, and formation of a unitary protrusion is initiated from the same end portion but on an opposite side of the plate. The structure then moves to a formed position completing the formation of the protrusion, clamping the plate between the head and protrusion, and thus firmly attaching the plate to the rod producing the fastener.

20 Claims, 4 Drawing Sheets

( Intermediate Position )

( Pre-staged or Loading Position )

( Staged Position )

( Initialzing Position )

FASTENER FORMING APPARATUS AND METHOD FOR MAKING A FASTENER OF METAL

FIELD OF THE INVENTION

The present invention relates generally to a fastener forming apparatus for making a fastener of metal, and more particularly to an anchor or striker and a method for making it.

BACKGROUND OF THE INVENTION

Some prior fasteners of metal have a metal rod projecting from and attached to a separate metal base plate by complementary threads, a threaded nut, or a weldment. Such a fastener can be used as a striker for a vehicle door latch, or a shoulder anchor for a vehicle seat belt. Examples of door latch strikers are taught in U.S. Pat. Nos. 6,273,480 and 6,267,421 and examples of anchors for shoulder seat belts and mounting bolt structures for brake actuators are taught in U.S. Pat. Nos. 5,779,270 and 5,787,794, respectively, and incorporated herein by reference. Typically, the stamped plate is mounted to the chassis of the vehicle and the pre-mounted rod, threaded lug or striker projects therefrom to serve a particular attachment, connector or retainer function.

In all of these applications, the plate-to-rod connection or fastener must be reliable and capable of withstanding considerable load and without fracture. To meet these requirements, the anchor has typically been manufactured from numerous parts with numerous manufacturing and assembly steps which contribute to the overall cost of the anchor. For instance, known methods of securing a rod to a stamped plate include first forming threads on a base end of the rod, placing the base end through an aperture in the plate and then threading a nut onto the threaded base end. Another method includes manufacturing a striker sleeve having inner threads, then threading a bolt into the sleeve from the opposite or inward side of the plate. Other methods include butt welding the rod to the plate, and another method includes press fitting separate collars over the rod, inserting the rod through an aperture in the plate to bear on the collars, and then welding or causing plastic deformation of the end of the rod to engage the opposite side of the plate.

Strikers of door, hood and trunk latches in automotive vehicles are typically secured to the body via the stamped base plate which has a hole at each end for receiving a pair of threaded bolts which thread into the vehicle body. Often, the holes are elongated to permit some positioning adjustment of the projecting rod with respect to the body. The base plate of the striker typically has two apertures positioned between the two bolt mounting holes for receiving end portions of the rod which is generally U-shaped. Securing the rod to the base plate is not a one step manufacturing process and often requires additional parts. For instance, prior to inserting the ends of the U-shaped rod through the apertures in the base plate, separate collars are press fitted to each end or formed unitarily onto each end portion via some additional step of stamping. Once the collars are press fitted, or stamped, only then is the plate fitted to the U-shaped rod and appropriately located or seated via the press fitted or formed collars. After the base plate and the U-shaped rod with the formed collars are pre-assembled, they are attached together by welding or by two additional collars or buttons formed on the opposite side of the base plate by hot upsetting in a welder, staking in a press, or by an orbital riveting or staking process.

Manufacturing and assembly of the first two collars requires additional steps in the manufacturing process which contributes to the overall cost of the striker or latch catch. Moreover, the strength of the striker is dependent upon the questionable reliability of the weld, or can be influenced negatively by internal stresses created during press fitting, upsetting and staking processes. Yet further, collars formed in secondary operations have a problem with dimensions on collars to be unequal in length or thickness causing location to the stamping to vary. When the finished assembly requires parts to be over molded with plastic or insert molded the problem is magnified.

SUMMARY OF THE INVENTION

A fastener forming apparatus produces a fastener of metal having a rod-to-plate connection often found in such applications as an automotive door latch striker. The fastener is manufactured in a single operation and with only a rod and a stamped plate for parts. The forming apparatus has a die structure for securing the rod, a base for vertically aligning the rod, a compression pedestal for vertically aligning the plate and a suspended stamping structure. The stamping structure moves from a pre-staged position for loading of the rod and plate to the die structure, to an intermediate position wherein buttons are substantially formed unitarily at the end portion(s) of the rod on one side of the plate, and collars are substantially formed unitarily at the end portion(s) and on the opposite side of the plate. The structure then moves to a stamped position wherein the collar formation to the end portions is completed, thus engaging the plate to the rod between the radially projecting rod head and collar.

Preferably, the stamping structure has an electrode which makes initial contact with the end portion when the stamping structure moves from the pre-staged position and into an initializing position and before movement to the intermediate position. When the structure moves from the intermediate position the distance between the electrode and the plate remains constant while the pedestals compress thus reducing the distance between the plate and the die structure to complete formation of the collar without further compressing and thus sacrificing the strength of the head.

Objects, features and advantages of this invention include the manufacturing of a high strength and inexpensive fastener of metal such as that required for strikers of automotive door latches, and an article or striker produced from a minimal number of parts, a minimal number of manufacturing and assembly steps, and without the expense of welding.

BRIEF DESCRIPTION OF THE DRAWINGS

These and other objects, features and advantages of this invention will be apparent from the following detailed description of the preferred embodiment and best mode, appended claims, and accompanying drawings in which:

DETAILED DESCRIPTION OF THE PREFERRED EMBODIMENTS

Figure 5:
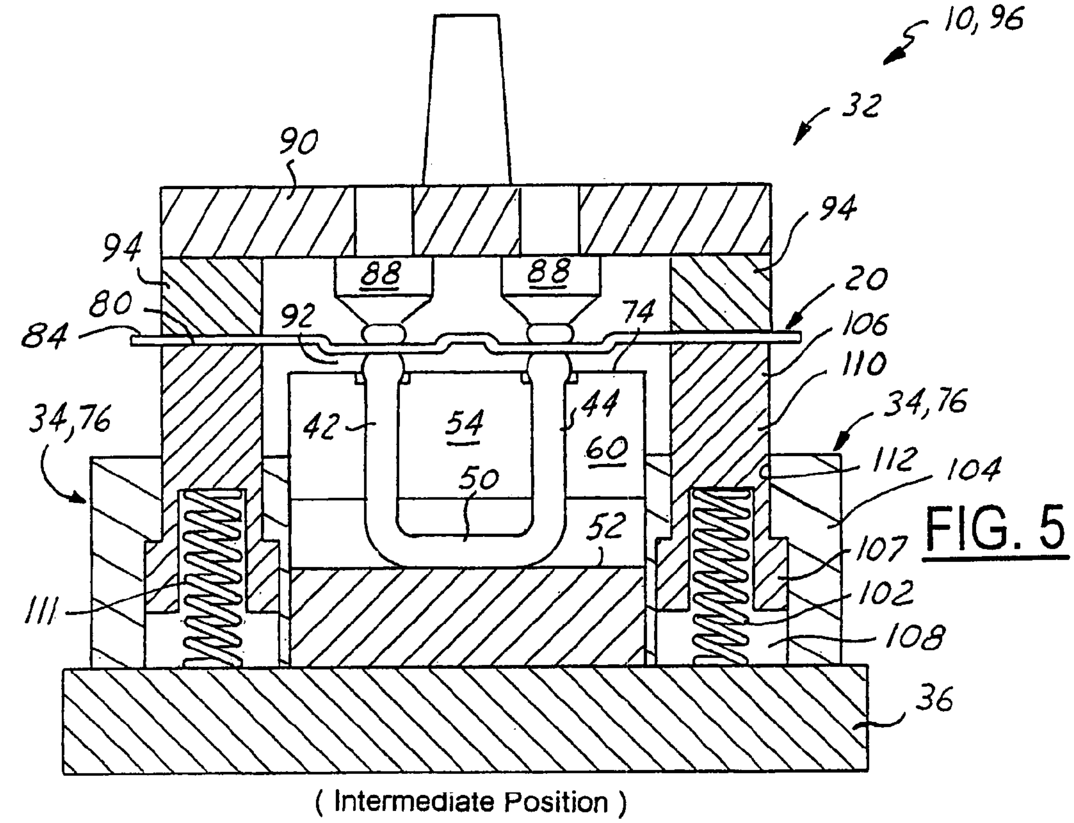
FIG. 5 is a cross section of the fastener forming apparatus illustrated in an intermediate position.
Figure 6:
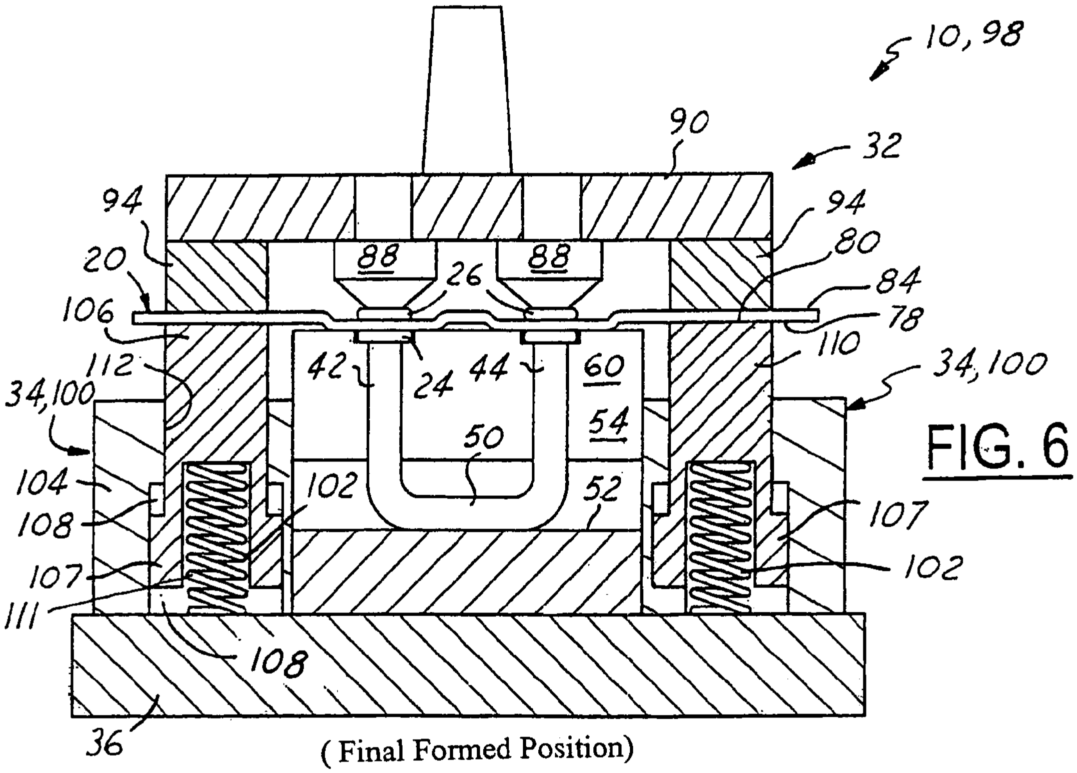
FIG. 6 is a cross section of the fastener forming apparatus illustrated in a final stamped position.
Figure 7:
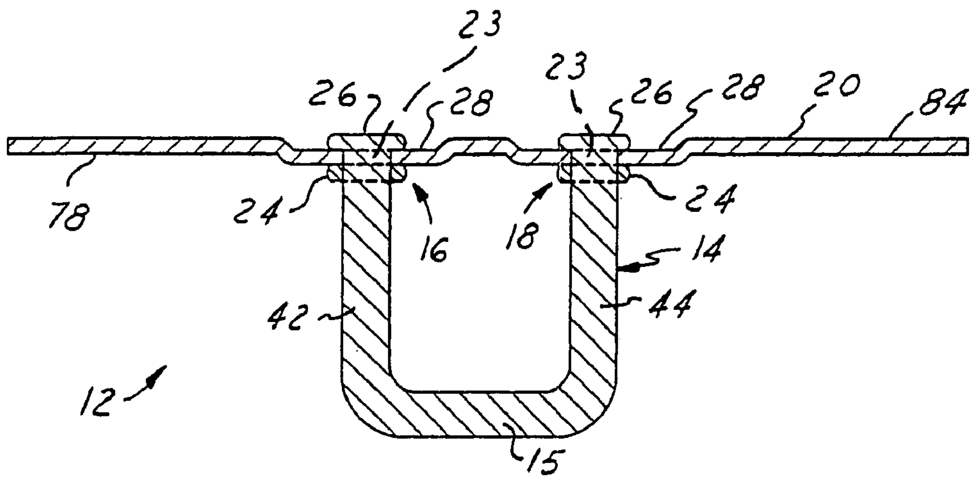
FIG. 7 is a cross section of a fastener of metal according to one aspect of the present invention and produced by the fastener forming apparatus.
Figure 8:
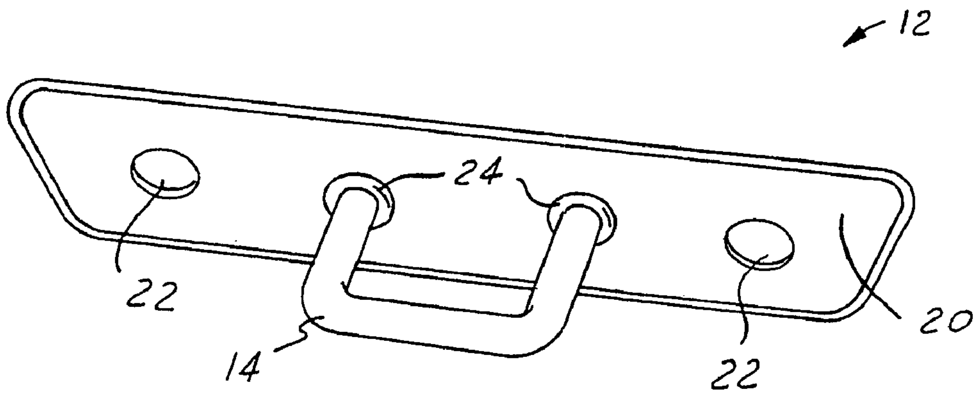
FIG. 8 is a perspective view of the fastener of metal.

Referring in more detail to the drawings, FIGS. 1–6 illustrate a fastener forming apparatus 10 of the present invention which makes a fastener of metal 12, as best illustrated in FIGS. 7–8 and also embodying the present invention. Preferably, the fastener of metal 12 takes the form of a striker for a door, hood, or trunk of an automotive vehicle. The striker 12 has a generally U-shaped metal rod or wire form 14 having a mid portion or bight 50 and a pair of vertical legs 42, 44 each having distal end portions 16, 18 permanently attached to a metal base plate 20 preferably having a pair of mounting through holes 22 adjacent to its ends. Each end portion 16, 18 of the rod extends through an aperture 23 in the plate 20 (as best shown in FIG. 7) and is permanently attached to the plate by entrapment of the plate between a protrusion or collar 24 and a head or button 26, both formed as a unitary part of its associated end portion 16, 18 of respective legs 42, 44.

Preferably, the base plate 20 is made by the method of die stamping a metal base plate 20 and punching the holes 22 and apertures 23 therein. So that the plate 20 can rest flush on a mounting surface such as a vehicle body or jamb, a depression 28 is preferably stamped into the plate 20 to accommodate the axial depth of each head 26. A preform of the generally U-shaped rod 14 is made by a wire or rod bending or stamping process. Preferably, the U-shaped rod 14 is attached to the plate 20 by inserting the free distal end portions 16, 18 of legs 42, 44 through the apertures 23 in the plate and then substantially simultaneously forming the protrusion 24 and head 26 on each leg. Preferably, all of the protrusions and heads on both legs are substantially simultaneously formed preferably by hot forming or upsetting although for some applications, they may be cold formed or upset.

Figure 1:
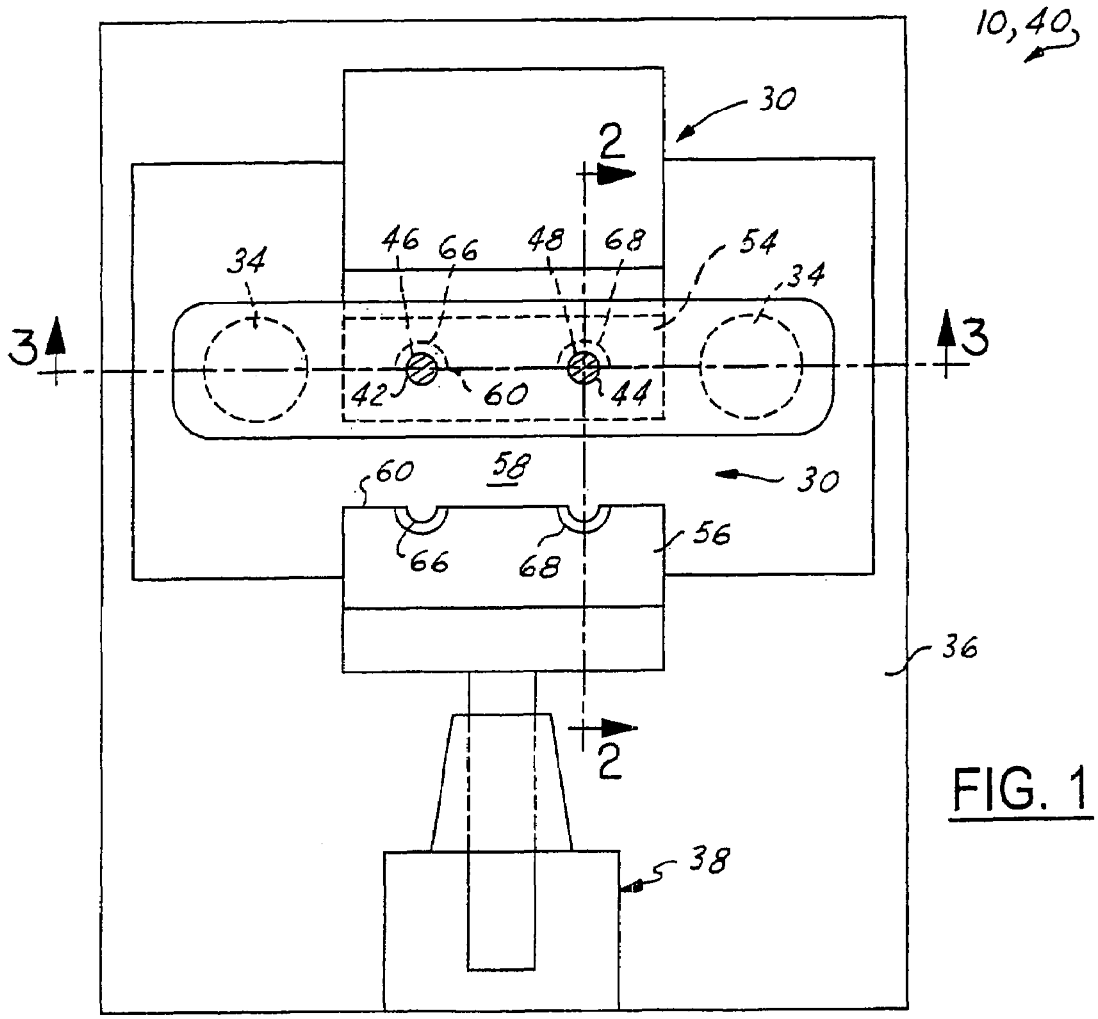
FIG. 1 is a top view of a fastener forming apparatus according to one embodiment of the present invention illustrated in a loading position and with an overhead stamping structure removed to show detail below.
Figure 2:
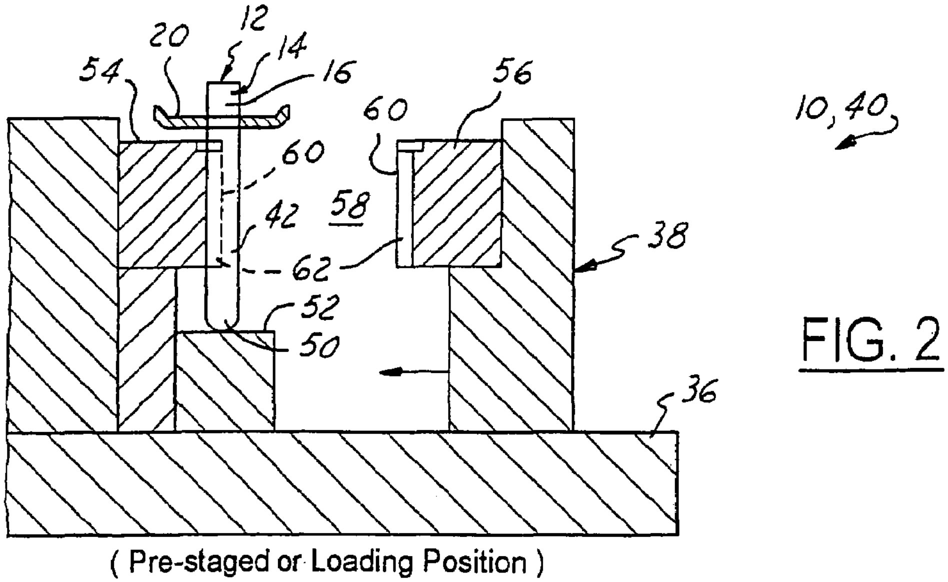
FIG. 2 is a cross section of the fastener forming apparatus taken along line 2—2 of FIG. 1.
Figure 3:
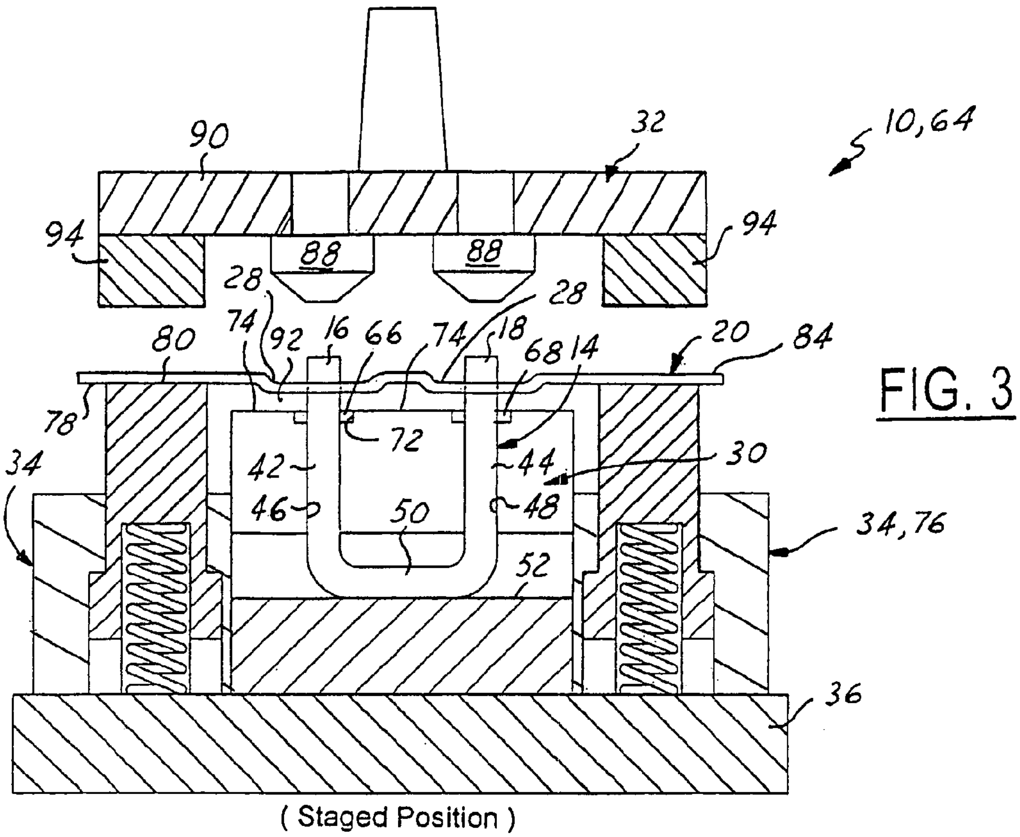
FIG. 3 is a cross section of the fastener forming apparatus illustrated in a staged position and taken along line 3—3 of FIG. 1.

FIGS. 1–6 illustrate the fastener forming apparatus 10 for attaching the rod preform to the mounting plate 20 by substantially simultaneously hot forming the protrusions 24 and heads 26 on both end portions 16, 18 of the preform with the plate 20 captured between them. The fastener forming apparatus 10 generally has a die structure 30 positioned below a suspended stamping structure 32 and between a pair of plate carriers or compression pedestals 34. The die structure 30 and compression pedestals 34 are supported by a base 36, which also supports a clamping device 38 (as best shown in FIGS. 2 and 3) for insertion and securing the U-shaped rod 14 to the die structure 30.

Referring to FIGS. 1–2, the forming apparatus 10 has a pre-staged or loading position 40 for placing each leg 42, 44 of the U-shaped rod 14 into respective generally vertical channels 46, 48 of the die structure 30 so that the distal end portions 16, 18 of each leg 42, 44 generally project upward from the die structure 30 and toward the suspended stamping structure 32 (not illustrated in FIG. 2). The bight or generally horizontal portion 50 of the U-shaped rod 14 which extends between the two legs 42, 44 contacts an upward facing alignment face 52 generally carried by the base 36 for vertically aligning the end portions 16, 18 with respect to the stamping structure 32 and compression pedestals 34.

The die structure 30 is generally divided into a first section 54 engaged rigidly to the base 36 and a second section 56 engaged to the clamping device 38. When the forming apparatus 10 is in the pre-staged position 40, the second section 56 is spaced horizontally away from the first section 54 thus providing a clearance 58 to insert the U-shaped rod 14. Each section 54, 56 carries opposing die sides 60 which define respective longitudinal halves 62 of both channels 46, 48. Once the legs 42, 44 of the rod 14 are positioned in the channel halves 62 of the first section 54 and the mid portion 50 is rested upon the alignment face 52, the clamping device 38 can be closed snugly securing the rod 14 within the die structure 30 and thus positioning the forming apparatus 10 into a staged position 64, as best illustrated in FIG. 3.

With the forming apparatus 10 in the staged position 64, the distal end portions 16, 18 of each leg 42, 44 project upward through respective protrusion forming recesses 66, 68 of each channel 46, 48. The recesses 66, 68 are defined by an annular bottom surface 70 and a substantially circular and continuous wall 72 which further defines the outer perimeter of the bottom surface 70 and extends axially upward to a top surface 74 carried by both sections of the die structure 30. The outer radius of the recess 66, 68 is appreciably larger than the radius of the non-deformed rod 14 to accommodate hot forming of the protrusions 24.

Also, when the forming apparatus 10 is in the staged position 64, the compression pedestals 34 are biased yieldably upward in an extended state 76 by a coiled compression spring 102, and project vertically beyond the top surface 74 of the die structure 30. Each compression pedestal 34 includes a guide housing 104 that has a through bore 112 and a counterbore 108, and an inverted piston assembly 106. The piston assembly includes a piston rod 110 received for guided reciprocation through the bore 112 and an enlarged head 107 received in the counterbore 108. Preferably, the extended position 76 of the piston rod 110 generally is defined by engagement of the head 107 with a radially inward projecting shoulder of the housing 104 and which in-part defines the counterbore 108. Also preferably, the spring 102 is co-located in the counterbore 108 with the piston assembly 106 and is substantially received in a blind bore 111 in the piston assembly 106.

Because a bottom side 78 of the plate 20 rests upon an end or top face 80 of the psiton rod 110, the plate 20 is generally spaced vertically above the top surface 74 of the die structure 30. However, the distal end portions 16, 18 of each leg 42, 44 project sufficiently above the top surface 74 to extend through respective apertures 23 (see FIG. 7) in the plate 20 and substantially centered in depressions 28. Moreover, the end portions 16, 18 project above an opposite top side 84 of the plate 20 toward, but still spaced vertically from, the stamping structure 32.

Figure 4:
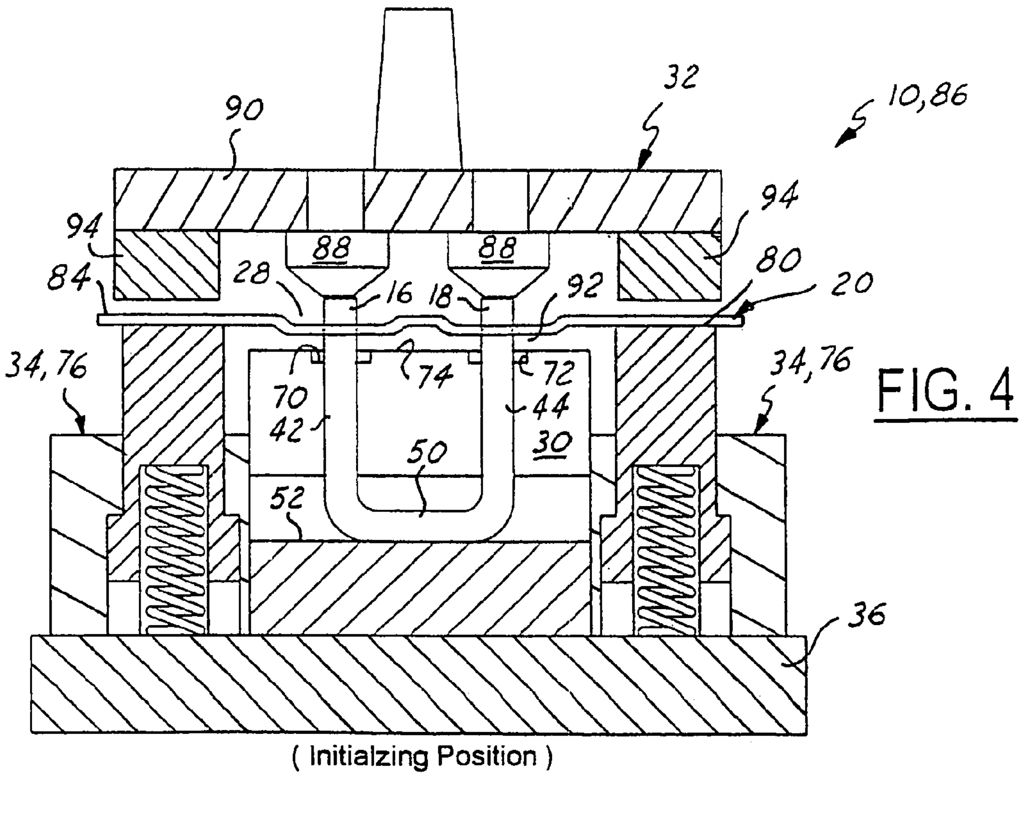
FIG. 4 is a cross section of the fastener forming apparatus illustrated in an initializing position.

Referring to FIG. 4, during manufacturing, the stamping structure 32 moves downward into a contact or initializing position 86 whereupon a pair of electrodes 88 projecting downward from a support member 90, contact the respective distal ends 16, 18 of the rod 14. At this point, the inverted piston assemblies 106 of the compression pedestals 34 remain in the extended state 76, hence the space 92 between the bottom side 78 of the plate 20 and the top surface 74 of the die structure 30 is not yet reduced. Also projecting downward toward each compression pedestal 34 and from the support member 90 are respective contact blocks 94 which remain spaced vertically from the top side 84 of the plate 20 when the forming apparatus 10 is in the initializing position 86.

Once contact is made between the electrodes 88 and respective end portions 16, 18, an electric current is delivered through the electrodes into the end portions 16, 18 of the rod 14 to heat the end portions of the legs 42, 44 to a hot forming temperature, thus assisting in the formation of the unitary button or head 26 and the simultaneously formation of the lower collar or protrusion 24 with the plate 20 disposed firmly in-between. FIG. 5 illustrates this as an initial forming or intermediate position 96 of the forming apparatus 10. When in the intermediate position 96, the heads 26 and protrusions 24 begin forming with the downward stamping action/force of the stamping structure 32. The contact blocks 94 make initial contact with the top side 84 of the plate 20 above the compression pedestals 34 which still substantially remain in the yieldably biased extended state 76, and the space 92 located between the bottom side 78 of the plate 20 and the top surface 74 of the die structure 30 is not yet substantially reduced.

Referring to FIG. 6, the continued downward movement of the stamping structure 32 moves the forming apparatus 10 from the intermediate position 96 and into the final stamped or formed position 98, this continued movement causes the piston assemblies 106 of the compression pedestals 34 to move downward into a retracted or compressed state 100 and the distal end portions 16, 18 to continue to flatten out causing the necessary plastic deformation to create the head 26 which contacts the top side 84 and the radially projecting unitary protrusion 24 formed in the respective recesses 66, 68 and contacting the bottom side 78 of the plate 20. The forming apparatus 10 is in the formed position 98 and the striker 12 is fully formed and assembled when the bottom side 78 of the plate 20 contacts the top surface 74 of the die structure 30 as the compression pedestals 34 are driven to their retracted position by the stamping structure 32.

When the forming apparatus is in the intermediate position 96, the heads 26 are substantially formed while the space 92 is still substantially present and the protrusions 24 are partially formed. With continued downward movement of the stamping structure 32, the heads 26, which are most prone to deformation because they are closest to the electrodes 88, are prevented from deforming further because contact block 94 engages the top side 84 of the plate 20. Thus, further downward movement moves the plate 20 in unison with the electrodes 88, and the compression pedestals 34 are forced to move from their extended state 76 to their retracted or compressed state 100 while completing the formation of the protrusions 24.

Unwanted distortion of the protrusions 24 is prevented by the confines of the recesses 66, 68. Similarly, the shape of the legs 42, 44 is maintained during the forming process by the confines of the channel halves 62 and clamping action of the first and second sections 54, 56 of the clamping device 38.

Preferably, the rod or wire form 14 may vary in design and shape and in one presently preferred construction has a nominal diameter before forming in the range of 6 to 10 millimeters. The forming process itself with use of the electrodes 88 is a type of hot forming or upsetting which upon cooling provides stress relief and shrinks to provide a tighter interference fit between the rod 14 and plate 20. If a tight interference fit via shrinkage is not required, the forming process need not utilize the electrodes 88 and a cold forming process can be used to create the heads 26 and protrusions 24.

While the forms of the invention herein disclosed constitute a presently preferred embodiment, many others are possible. For instance, the rod 14 may not be U-shaped and instead can be limited to a single linear leg 14 engaged to a plate by a single protrusion and head. With this fastener, the clamping device 38 of the forming apparatus 10 is not required. It is not intended herein to mention all the possible equivalent forms or ramifications of the invention. It is understood that terms used herein are merely descriptive, rather than limiting, and that various changes may be made without departing from the spirit or scope of the invention as defined by the following claims.

We claim:

1. A fastener forming apparatus for connecting a plate to an end portion of a rod, the fastener forming apparatus comprising:

a base;

a die structure carried by the base, the die structure having a first surface and a recess opened through the surface, and the end portion of the rod being disposed partially in the recess and projecting beyond the first surface;

a compression pedestal carried by the base, the compression pedestal being constructed and arranged to move between a biased extended state and a compressed state;

a stamping structure spaced from the base and die structure, the stamping structure being constructed and arranged to move with respect to the die structure;

an initial contact position of the stamping structure wherein the compression pedestal is in the extended state, and the stamping structure is in contact with the end portion;

an intermediate position of the stamping structure wherein the stamping structure is spaced closer to the die structure and the compression pedestal than when the stamping structure is in the initial contact position, the compression pedestal is in the extended state, and the end portion has plastic deformation; and a stamped position of the stamping structure wherein the stamping structure is spaced closer to the die structure than when the stamping structure is in the intermediate position, the plate contacts the first surface of the die structure, and the compression pedestal is driven to the compressed state.

2. The fastener forming apparatus set forth in claim 1 comprising:

a staged position of the stamping structure wherein the compression pedestal is in the extended state and the stamping structure is spaced farther away from the die structure and the compression pedestal than when the stamping structure is in the initial contact position;

the end portion of the rod extending through the plate;

a first side of the plate contacting the compression pedestal; and an opposite second side of the plate facing and being spaced from the stamping structure when the stamping structure is in the staged position.

3. The fastener forming apparatus set forth in claim 2 wherein the first side of the plate contacts the compression pedestal, the opposite second side contacts the stamping structure, the end portion contacts the stamping structure, and the end portion has plastic deformation on both sides of the plate when the stamping structure is in the intermediate position and the compression pedestal is in the extended state.

4. The fastener forming apparatus set forth in claim 1 wherein the end portion deforms radially outward within the recess.

5. The fastener forming apparatus set forth in claim 3 wherein the first side of the plate is spaced from the first surface when the stamping structure is in the staged position.

6. The fastener forming apparatus set forth in claim 3 wherein the first side of the plate contacts the compression pedestal, the opposite second side is spaced from the stamping structure, and the end portion of the rod prior to deformation contacts the stamping structure when the stamping structure is in the initializing position and the compression pedestal is in the extended state.

7. The fastener forming apparatus set forth in claim 6 wherein the first side contacts the compression pedestal and the stamping structure, the opposite second side contacts the stamping structure, the end portion of the elongated member contacts the stamping structure, and the end portion has a unitary head contacting the opposite second side and a unitary protrusion contacting the first side and disposed in the recess when the stamping structure is in the stamped position and the compression pedestal is driven into the compressed state.

8. The fastener forming apparatus set forth in claim 1 comprising:

an alignment face carried by the base;

a second surface carried by the die structure;

a continuous wall defining a periphery of the second surface and extending from the second surface to the first surface;

a continuous inner face carried by the die structure and defining a channel extending between the recess and the alignment face;

wherein the recess is generally annular and communicates radially inward with the channel; and wherein the rod contacts the alignment face and extends snugly through the channel.

9. The fastener forming apparatus set forth in claim 3 comprising:

a guide housing of the compression pedestal projecting from the base;

a bore and a counter-bore defined by the housing;

a yieldably reciprocating piston assembly having an enlarged head disposed slidably in the counter-bore and a piston rod projecting from the enlarged head and through the bore; and wherein the piston rod contacts the plate.

10. The fastener forming apparatus set forth in claim 9 comprising a compression spring of the compression pedestal disposed in the counter-bore and engaged between the piston assembly and the base.

11. The fastener forming apparatus set forth in claim 1 comprising an electrode of the stamping structure constructed and arranged to deliver an electric current for heating the rod.

12. The fastener forming apparatus set forth in claim 11 wherein the electrode contacts the end portion when the stamping structure is in the initializing, intermediate and stamped positions.

13. The fastener forming apparatus set forth in claim 8 comprising:

a third surface carried by the die structure;

a second continuous wall defining a periphery of the third surface and extending from the third surface to the first surface;

a second recess opened through the first surface;

a second continuous inner face carried by the die structure and defining a second channel extending between the alignment face and the second recess;

wherein the second recess is generally annular and communicates radially inward with the second channel; and wherein the rod is substantially U-shaped and a second end portion of the rod is disposed in the second recess and projects above the first surface.

14. The fastener forming apparatus set forth in claim 13 comprising a clamping device engaged between the die structure and the base.

15. The fastener forming apparatus set forth in claim 13 comprising:

a first section of the die structure having a die side forming first longitudinal halves of the first and second channels and recesses; and a second section of the die structure having a die side disposed opposite the die side of the first section and forming second longitudinal halves of the first and second channels and recesses.

16. The fastener forming apparatus set forth in claim 14 comprising:

a first section of the die structure having a die side forming first longitudinal halves of the first and second channels and recesses;

a second section of the die structure having a die side disposed opposite the die side of the first section and forming second longitudinal halves of the first and second channels and recesses; and wherein the first section is engaged rigidly to the base and the second section is engaged to the clamping device for moving laterally with respect to the U-shaped rod for clamping the rod into the die structure.

17. A fastener forming apparatus for connecting a plate to an end portion of a rod which is pre-extended through an aperture carried by the plate, the fastener forming apparatus comprising:

a base;

a die structure attached to the base, the die structure having a top surface facing upward and a recess open upward through the top surface;

wherein the end portion of the rod is disposed in the recess and projects upward above the top surface;

a compression pedestal projecting upward from the base, the compression pedestal being constructed and arranged to move vertically between a biased extended state and a compressed state;

a stamping structure disposed above the base and die structure, the stamping structure being constructed and arranged to move substantially vertically between a staged position, an initial contact position, an intermediate position and a stamped position;

wherein the end portion projects upward through the plate when the fastener forming apparatus is in the staged, contact, intermediate, and stamped positions;

wherein a bottom side of the plate contacts the compression pedestal, an opposite top side of the plate is spaced below the stamping structure when the stamping structure is in the staged position and the compression pedestal is in the extended state; and wherein the bottom side of the plate contacts the compression pedestal, the top side contacts the stamping structure, the end portion contacts the stamping structure, and the end portion has plastic deformation above and below the plate member when the stamping structure is in the intermediate position and the compression pedestal is in the extended state.

18. An apparatus for connecting a rod to a plate through which the rod extends, the apparatus comprising:

a base;

a die structure carried by the base, and having a first surface, a channel in the die structure in which the rod is received, and a recess formed in the first surface surrounding the channel;

a compression pedestal carried by the base and being constructed and arranged to move between an extended state and a compressed state;

a stamping structure spaced from the base and die structure, the stamping structure being constructed and arranged to move with respect to the die structure to engage and form the rod, and the stamping structure moves from an initial contact position wherein the compression pedestal is in the extended state and the stamping structure is in contact with the rod to a stamped position wherein the stamping structure is moved closer to the die structure than when the stamping structure is in the initial contact position, the compression pedestal is driven to the compressed state and a protrusion is formed on the rod between the plate and the die structure with the shape of the protrusion being defined by the recess and the plate.

19. The apparatus of claim 18 wherein the plate contacts the first surface of the die structure in the area of the recess when the stamping structure is in the stamped position.

20. The apparatus of claim 19 wherein the plate moves from a position spaced from the first surface to a position in contact with the first surface as the stamping structure is moved to the stamped position and the movement of the plate aids in the formation of the protrusion.

* * * * *